C. A. WHALE & J. H. BLACK.
RESILIENT WHEEL.
APPLICATION FILED JAN. 22, 1915.
1,157,272.
Patented Oct. 19, 1915.
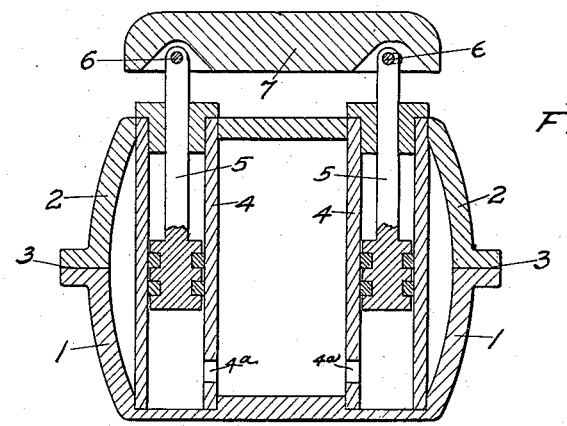
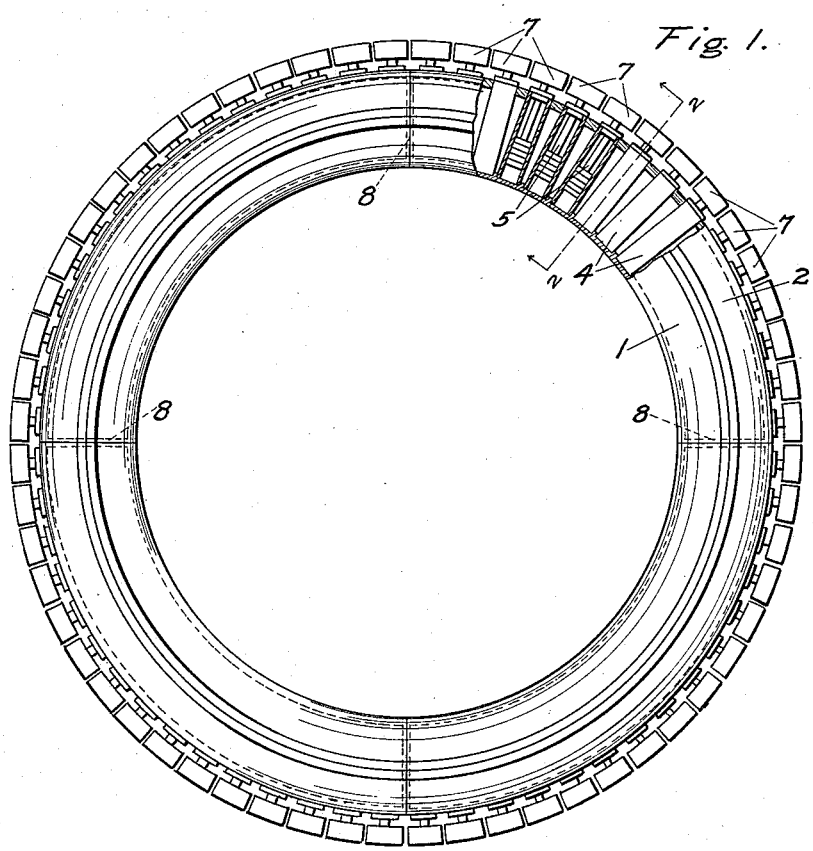

UNITED STATES PATENT OFFICE.

CHARLES A. WHALE AND JAMES H. BLACK, OF PORTLAND, OREGON.

RESILIENT WHEEL.

1,157,272. Specification of Letters Patent. Patented Oct. 19, 1915.

Application filed January 22, 1915. Serial No. 3,762.

*To all whom it may concern:*

Be it known that we, CHARLES A. WHALE and JAMES H. BLACK, citizens of the United States, residing in the city of Portland, county of Multnomah, and State of Oregon, have invented certain new and useful Improvements in Resilient Wheels, of which the following is a specification.

Our invention relates to resilient wheels, and more particularly to a wheel rim of new and novel construction, adapted to compensate for any unevenness in the surface over which the wheel may be passing and to effectively absorb any vibration or shaking which would otherwise be transmitted to the body of the vehicle.

Among the salient objects of our invention are,—to provide in combination with a wheel rim a series of tread members movably mounted around said rim, and supported yieldably therein at a space therefrom, whereby to permit of relative movement of said tread members toward and from said rim as weight is brought upon them during the turning of the wheel; to provide in such a wheel rim a series of small cylinders with pistons projecting therefrom and working therein and to which said tread members are attached; to provide in such a device a hollow wheel rim adapted to hold a mixture of oil and air under pressure, or other medium, which moves freely within said rim and into and out of said small cylinders as said pistons are moved inwardly or outwardly with the tread members; and, in general, to provide a simple, practical and efficient wheel rim of the character referred to in which a series of independent tread members are yieldably supported around a wheel rim and adapted to move radially toward and from the same under pressure.

In order that others may thoroughly understand our invention, we have shown in the accompanying sheet of drawings one simple embodiment of the same for illustrative purposes, which we will now describe.

Figure 1 is a side elevation of a wheel rim embodying our invention, with a part of the side broken away to show the interior arrangement, and with a few of the small cylinders shown in section; and Fig. 2 is a cross sectional view through the rim, as on line 2—2 of Fig. 1.

Referring now more in detail to the drawings, the wheel rim is of hollow ring-like construction, made of metal, and may be cast in two sections, an inner section designated 1, and an outer section designated 2, and provided at their meeting edges with suitable flanges, as 3, by means of which they are secured together, with any suitable packing therebetween. We prefer to form said rim members with flat top and bottom, substantially as indicated, though it is evident that they could be made round in cross section, if desired. We provide in said rim, at opposite sides thereof, two series of small cylinders, as 4—4, with pistons, 5—5, working therein, and pivotally connected at their outer ends, as at 6—6, to the opposite ends of transversely disposed tread members 7—7, which are so constructed and arranged that they will move freely with the pistons and readily compensate for any unevenness in the surface over which the wheel is passing. One of said pistons 6, it will be noted, is pivotally connected to the tread member 7 by means of a slot and pin connection, whereby to compensate for any tilted movement of said tread member inwardly.

As an effective medium within the rim and in the small cylinders 4—4, we fill the rim partially full of oil and then with compressed air. The cylinders are provided near their lower ends with ports, 4ª, through which they communicate with the interior of the rim and through which the oil and compressed air pass into and out of the cylinders as the pistons are moved back and forth therein, thus effectively and yieldingly resisting the movement of said pistons, and consequently the movement of the tread members relative to the wheel rim.

By providing in the wheel rim, crosswise thereof, partitions, as 8, indicated in dotted lines, the interior of the rim may be divided into four, or more or less, separate chambers, independent of each other, thus making more effective the pressure resisting the movements of the pistons in the small cylinders.

We are aware that many changes can be made in the invention as here illustrated for purposes of explanation without departing from the spirit thereof, and we do not, therefore, limit the invention to this particular form, or to the detailed description thereof, except as we may be limited by the hereto appended claims, forming a part thereof.

What we claim and desire to protect by Letters Patent is,—

1. In a resilient wheel, a hollow wheel rim provided with two series of small cylinders radially disposed therein and communicating with the interior thereof, pistons working in said small cylinders and projecting radially outwardly from said hollow rim, a series of tread members pivotally attached to the outer ends of said pistons, each tread member being connected at its opposite ends to opposite pistons and extending transversely of said rim, and a resilient medium consisting of a heavy liquid and air filling said hollow rims and said pistons, whereby the movements of the pistons within the small cylinders are yieldingly retarded by said medium, substantially as described.

2. In a resilient wheel, a hollow wheel rim provided with two series of small cylinders radially disposed therein and communicating with the interior thereof through restricted openings in the sides of said cylinders, said cylinders being anchored at their outer and inner ends in the outer and inner walls of said hollow wheel rim, two series of pistons working in said small cylinders and projecting radially outwardly from said hollow rim, a series of tread members pivotally attached to the outer ends of said pistons, each tread member being connected at its opposite ends to opposite pistons and extending transversely of said rim, and a resilient medium consisting of a heavy liquid and air filling said hollow rims and said pistons, whereby the movements of the pistons within the small cylinders are yieldingly retarded by said medium, substantially as described.

3. A wheel rim of the character described comprising a hollow rim provided with partition members dividing it into separate chambers, two series of small cylinders arranged side by side and radially disposed within each chamber, pistons working in said cylinders, tread members transversely disposed and pivotally connected at their opposite ends with opposite pistons projecting from said wheel rim and said cylinders, and a resilient medium consisting of oil and air within said rim chambers and said cylinders, said cylinders communicating through restricted openings in their sides with the interior of the rim chambers, substantially as described.

4. A resilient wheel rim comprising a hollow rim, two series of small cylinders, radially disposed therein side by side around the interior of said rim, pistons working in said cylinders and projecting radially outwardly from said rim, and a series of tread members transversely disposed around said rim and each pivotally connected at its opposite ends to opposite pistons, substantially as described.

Signed at Portland, Oregon, this 16th day of January, 1915.

CHARLES A. WHALE.
JAMES H. BLACK.

In presence of—
J. C. STRENG,
J. C. SIMMONS.

Copies of this patent may be obtained for five cents each, by addressing the "Commissioner of Patents, Washington, D. C."